(12) United States Patent
Zhang et al.

(10) Patent No.: US 12,466,749 B1
(45) Date of Patent: Nov. 11, 2025

(54) FLOCCULANT FOR TREATING FRACTURING FLOWBACK FLUID AND PREPARATION METHOD THEREFOR

(71) Applicant: Shineon Environments Technology Services Co., Ltd., Chengdu (CN)

(72) Inventors: Tao Zhang, Chengdu (CN); Guanjun Wang, Chengdu (CN); Fuyou Huang, Chengdu (CN); Sheng Zhou, Chengdu (CN); Xiongying He, Chengdu (CN); Weisheng Zhao, Chengdu (CN); Jing Luo, Chengdu (CN)

(73) Assignee: Shineon Environments Technology Services Co., Ltd., Chengdu (CN)

( * ) Notice: Subject to any disclaimer, the term of this patent is extended or adjusted under 35 U.S.C. 154(b) by 0 days.

(21) Appl. No.: 19/051,404

(22) Filed: Feb. 12, 2025

(30) Foreign Application Priority Data

May 8, 2024 (CN) .......................... 202410560049.6

(51) Int. Cl.
*C02F 1/56* (2023.01)
*C02F 1/52* (2023.01)
*C02F 1/54* (2023.01)
*C02F 101/20* (2006.01)
*C02F 101/30* (2006.01)
*C02F 103/10* (2006.01)

(52) U.S. Cl.
CPC .............. *C02F 1/56* (2013.01); *C02F 1/5272* (2013.01); *C02F 1/542* (2013.01); *C02F 2101/203* (2013.01); *C02F 2101/308* (2013.01); *C02F 2103/10* (2013.01)

(58) Field of Classification Search
CPC .......... C02F 1/56; C02F 1/5272; C02F 1/542; C02F 2101/203; C02F 2101/308; C02F 2103/10
See application file for complete search history.

(56) References Cited

U.S. PATENT DOCUMENTS

| | | | | |
|---|---|---|---|---|
| 2003/0150573 | A1* | 8/2003 | Anderson | C08L 101/00 162/158 |
| 2021/0045942 | A1* | 2/2021 | Chan | A61L 15/64 |
| 2025/0154035 | A1* | 5/2025 | Gothard | C02F 1/68 |

FOREIGN PATENT DOCUMENTS

| | | | | |
|---|---|---|---|---|
| CN | 104292386 | B | | 1/2015 |
| CN | 108192049 | A | | 6/2018 |
| CN | 108359062 | A | | 8/2018 |
| CN | 108773888 | A | * | 11/2018 ............ C02F 1/5245 |
| CN | 109536154 | A | | 3/2019 |
| CN | 109627397 | B | | 4/2019 |
| CN | 113461129 | B | | 10/2021 |
| CN | 118126245 | A | * | 6/2024 ................ C02F 1/56 |
| CN | 119977121 | A | * | 5/2025 |
| CN | 119978241 | A | * | 5/2025 |
| EP | 2824124 | A1 | | 1/2015 |
| WO | 2009150727 | | | 12/2009 |

OTHER PUBLICATIONS

Zhang Guanghua, etc. "Effect of phosphate functional monomer on anti-clay properties of polycarboxylate superplasticizer" «Chemical Industry and Engineering Progress» vol. 37, Issue 6 , Jun. 5, 2018 (Jun. 5, 2018), pp. 2364-2369.

* cited by examiner

*Primary Examiner* — Haidung D Nguyen
(74) *Attorney, Agent, or Firm* — Birchwood IP

(57) ABSTRACT

Disclosed are a flocculant for treating fracturing flowback fluid and a preparation method therefor, which relate to oilfield sewage treatment. The method includes: in parts by weight, dissolving gelatinized starch in water, adding unsaturated polyethylene glycol, unsaturated short-chain carboxylic acid, hydroxyethyl methacrylate phosphate and an initiator under a nitrogen atmosphere for reaction for 3-8 h, and after the reaction is completed, separating and purifying to obtain a product. The flocculant for treating fracturing flowback fluid is prepared by a one-pot method, and the solvent is water, so that the preparation method is simple and has better environmental protection performance; meanwhile, the flocculant not only can reduce turbidity, color and suspended matters of the flowback fluid, but also can effectively reduce COD and total iron of the flowback fluid, and also can reduce the mineralization to a certain degree. The flocculant has good biodegradability and has less impact on the environment.

8 Claims, No Drawings

FLOCCULANT FOR TREATING FRACTURING FLOWBACK FLUID AND PREPARATION METHOD THEREFOR

CROSS-REFERENCE TO RELATED APPLICATIONS

This application claims priority to Chinese Patent Application No. 202410560049.6, filed on May 8, 2024, which is hereby incorporated by reference in its entirety.

TECHNICAL FIELD

The present application relates to the technical field of oilfield sewage treatment, and in particular, to a flocculant for treating fracturing flowback fluid and a preparation method therefor.

BACKGROUND

Low-permeability oil and gas reservoirs have become one of the most important fields for exploration and development. Data show that low-permeability oil reservoirs account for more than a quarter of the proven oil and gas reserves of the year. Practices at home and abroad have proved that hydraulic fracturing is an irreplaceable technology for the current exploitation of low-permeability oil and gas reservoirs, and plays an important role in stabilizing and increasing the production of oil and gas fields. The amount of water required during the fracturing process is huge. According to reports, the amount of water required for fracturing a single well is usually from several thousand cubic meters to tens of thousands of cubic meters, resulting in the production of thousands of cubic meters of fracturing flowback fluid.

Generally, fracturing fluid is composed of organic and inorganic agents such as thickeners, cross-linkers, clay stabilizers and drainage aids. After fracturing and flowback, the fracturing fluid also brings out a large amount of pollutants such as calcium, magnesium, heavy metals, suspended particles in the formation. Therefore, the fracturing flowback fluid is a waste that is currently difficult to handle in oil fields. The fracturing flowback fluid has characteristics of higher viscosity, higher salt content, and a certain degree of emulsification. Currently, the treatment for the fracturing flowback fluid includes: natural sedimentation, flocculation, filtration, and fine filtration. In the flocculation process, it is usually necessary to add flocculants. Considering the characteristics of the flowback fluid, polyaluminum chloride, polyacrylamide, and the like are commonly used at present. The polyaluminum chloride has a relatively poor effect, and the polyacrylamide has a relatively good effect; however, the polyacrylamide has a large molecular weight, usually reaching millions, and is difficult to degrade naturally, resulting in new problems in the treatment of the flowback fluid.

SUMMARY

To solve at least one of the above problems, the present application proposes a flocculant for treating fracturing flowback fluid and a preparation method therefor. This method is simple, and the prepared flocculant exhibits a good flocculation effect and a high biodegradation rate, making it well-suited for treating fracturing flowback fluid.

A technical solution of the present application is as follows: a preparation method for a flocculant for treating fracturing flowback fluid includes the following steps in parts by weight: dissolving gelatinized starch in water, adding unsaturated polyethylene glycol, unsaturated short-chain carboxylic acid, hydroxyethyl methacrylate phosphate and an initiator under a nitrogen atmosphere for reaction for 3-8 h, and after the reaction is completed, separating and purifying to obtain a product; wherein a mass ratio of the gelatinized starch to the unsaturated polyethylene glycol to the unsaturated short-chain carboxylic acid to the hydroxyethyl methacrylate phosphate is 100:20-40:3-8:1-5.

For gelatinized starch, a commercial product of gelatinized starch may be purchased, or conventional starch may be gelatinized. The gelatinization operation may refer to the following steps: adding starch into water, uniformly stirring, heating to a gelatinization temperature (usually 60-80° C.), keeping the temperature for 30-120 min, and removing water after temperature preservation is completed. Of course, there are also microwave gelatinization processes and the like in the art, and gelatinized starches prepared therefrom may also be suitably used in the present application. Meanwhile, for starch, most of the starch gelatinized at present can be used for the present application, such as common corn starch, sweet potato starch and cassava starch. However, the effect of the sweet potato starch is better by the experiments of the inventors.

Conventional starch-based flocculants not only contain a large amount of acrylamide or acrylic acid in raw materials and also contain certain cross-linkers. The final product has relatively poor solubility and dissolution rate, and is prone to gel formation under certain conditions, resulting in a significant decrease in the flocculation effect. After extensive research, the inventors find that when unsaturated polyethylene glycol, unsaturated short-chain carboxylic acid and hydroxyethyl methacrylate phosphate are used as grafted materials, the final flocculant not only has a good flocculation effect. Meanwhile, the addition amount of these monomers is relatively low, and the final product is still based on starch. Therefore, the flocculant prepared by the present application has good environmental performance.

In one embodiment of the present application, the unsaturated polyethylene glycol is one of allyl polyethylene glycol ether and methallyl polyethylene glycol ether, and has a molecular weight of 400-1000. In the present application, the unsaturated polyethylene glycol and the hydroxyethyl methacrylate phosphate generate synergistic action, thereby increasing the flocculation effect of the flocculant. When the molecular weight of the unsaturated polyethylene glycol is too large or too small, the effect is reduced to some extent.

In one embodiment of the present application, the unsaturated short-chain carboxylic acid is one of acrylic acid, methacrylic acid and maleic acid.

In one embodiment of the present application, the initiator is a mixture of a first initiator and persulfate, the first initiator is one of cerium sulfate, ammonium cerium sulfate and ammonium cerium nitrate, a mass ratio of the first initiator to the persulfate is 1:0.4-0.8, and an addition amount of the initiator is 0.5%-1.5% of a mass of the gelatinized starch. These initiators are commonly used in starch grafting acrylamide/acrylic acid.

In one embodiment of the present application, the initiator is potassium permanganate, and an addition amount of the potassium permanganate is 0.8%-2% of a mass of the gelatinized starch. Potassium permanganate is also a common initiator in the process of starch grafting acrylamide/acrylic acid. However, the inventors find that, compared with cerium-based initiators, the flocculant prepared by adding potassium permanganate dropwise to the starch solution has a relatively better effect.

In one embodiment of the present application, the method includes the following steps: dissolving gelatinized starch in water, introducing nitrogen to remove oxygen, adding an initiator, uniformly stirring, dropwise adding unsaturated polyethylene glycol or an aqueous solution thereof, unsaturated short-chain carboxylic acid or an aqueous solution thereof and hydroxyethyl methacrylate phosphate, reacting for 3-8 h at an initiation temperature after dropwise adding is completed, and separating and purifying to obtain a product.

In one embodiment of the present application, the separation and purification include: distilling the product after the reaction under reduced pressure to remove a solvent to obtain a crude product, washing the crude product several times by using ethanol or acetone, and drying to obtain the flocculant.

Another objective of the present application is to provide a flocculant for treating fracturing flowback fluid. The flocculant is prepared by any one of the methods. The flocculant has good performance and can better treat fracturing flowback fluid.

The beneficial effects of the present application are as follows:

The flocculant for treating fracturing flowback fluid is prepared by a one-pot method, and the solvent is water, so that the preparation method is simple and has better environmental protection performance; meanwhile, the flocculant prepared by the present application not only can reduce turbidity, color and suspended matters of the fracturing flowback fluid, but also can effectively reduce COD and total iron of the flowback fluid, and also can reduce the mineralization to a certain degree. Therefore, the flocculant for treating fracturing flowback fluid of the present application can treat fracturing flowback fluid well.

Meanwhile, the flocculant for treating fracturing flowback fluid has good biodegradability and has less impact on the environment.

DESCRIPTION OF EMBODIMENTS

The following clearly and completely describes the technical solutions of the present application with reference to embodiments of the present application. It is clear that the described embodiments are merely a part rather than all of embodiments of the present application. Based on the examples of the present application, all other examples obtained by those of ordinary skill in the art without creative efforts shall fall within the protection scope of the present application.

In the following examples, all raw materials may be commercially available unless otherwise specified.

In the following examples, the operations are all routine operations in the art unless otherwise specified.

Example 1: 100 g of pregelatinized sweet potato starch was dissolved in water. 0.75 g of ammonium ceric sulfate and 0.45 g of potassium persulfate were added and stirred uniformly. Nitrogen was introduced for 30 min to remove oxygen. 35 g of allyl polyethylene glycol ether APEG-800 was dissolved in water. 3.5 g of acrylic acid, the allyl polyethylene glycol ether solution and 4.0 g of hydroxyethyl methacrylate phosphate were dropwise added into the gelatinized starch solution. The mixture was reacted for 6 h at 20° C. under continuous stirring. After the reaction was completed, distillation was performed under reduced pressure to remove the solvent to obtain a crude product. Then the crude product was washed several times by using acetone and dried to obtain a flocculant A1.

Example 2: 100 g of pregelatinized corn starch was dissolved in water. 0.75 g of ammonium ceric sulfate and 0.45 g of potassium persulfate were added and stirred uniformly. Nitrogen was introduced for 30 min to remove oxygen. 30 g of allyl polyethylene glycol ether APEG-700 was dissolved in water. 3.5 g of acrylic acid, the allyl polyethylene glycol ether solution and 4.0 g of hydroxyethyl methacrylate phosphate were dropwise added into the gelatinized starch solution. The mixture was reacted for 5 h at 25° C. under continuous stirring. After the reaction was completed, distillation was performed under reduced pressure to remove the solvent to obtain a crude product. Then the crude product was washed several times by using acetone and dried to obtain a flocculant A2.

Example 3: 100 g of pregelatinized cassava starch was dissolved in water. 0.75 g of ammonium ceric sulfate and 0.45 g of potassium persulfate were added and stirred uniformly. Nitrogen was introduced for 30 min to remove oxygen. 35 g of allyl polyethylene glycol ether APEG-800 was dissolved in water. 7.0 g of acrylic acid, the allyl polyethylene glycol ether solution and 2.5 g of hydroxyethyl methacrylate phosphate were dropwise added into the gelatinized starch solution. The mixture was reacted for 6 h at 20° C. under continuous stirring. After the reaction was completed, distillation was performed under reduced pressure to remove the solvent to obtain a crude product. Then the crude product was washed several times by using acetone and dried to obtain a flocculant A3.

Example 4: 100 g of pregelatinized cassava starch was dissolved in water. 0.75 g of ammonium ceric sulfate and 0.45 g of potassium persulfate were added and stirred uniformly. Nitrogen was introduced for 30 min to remove oxygen. 40 g of allyl polyethylene glycol ether APEG-1500 was dissolved in water. 7.0 g of acrylic acid, the allyl polyethylene glycol ether solution and 2.5 g of hydroxyethyl methacrylate phosphate were dropwise added into the gelatinized starch solution. The mixture was reacted for 6 h at 20° C. under continuous stirring. After the reaction was completed, distillation was performed under reduced pressure to remove the solvent to obtain a crude product. Then the crude product was washed several times by using acetone and dried to obtain a flocculant A4.

Example 5: 100 g of pregelatinized sweet potato starch II was dissolved in water. Nitrogen was introduced for 30 min to remove oxygen. 1.2 g of potassium permanganate was dissolved in water. 6.5 g of maleic acid, 22 g of allyl polyethylene glycol ether APEG-500, 2.0 g of hydroxyethyl methacrylate phosphate and a potassium permanganate solution were dropwise added into the gelatinized starch solution. The mixture was reacted for 6 h at 40° C. under continuous stirring. After the reaction was completed, distillation was performed under reduced pressure to remove the solvent to obtain a crude product. Then the crude product was washed several times by using acetone and dried to obtain a flocculant A5.

Comparative Example 1: the difference between this comparative example and Example 1 is that allyl polyethylene glycol ether is not added, and the rest is the same, and finally the flocculant D1 is obtained.

Comparative Example 2: the difference between this comparative example and Example 1 is that hydroxyethyl methacrylate phosphate is not added, and the rest is the same, and finally the flocculant D2 is obtained.

Comparative Example 3: the difference between this comparative example and Example 1 is that the amount of acrylic acid added is changed to 35 g, and the rest is the same, and finally the flocculant D3 is obtained.

To further illustrate the advantages of the flocculant prepared in the examples of the present application, the flocculant is tested as follows.

1. Flocculation Effect Test

The fracturing flowback from an oil field in Xinjiang was first naturally settled to remove large particle impurities, and then 0.2% flocculant was added to treat the fracturing flowback. The changes in the indexes of the fracturing flowback fluid before and after flocculation treatment are shown in Table 1.

TABLE 1

Changes in indexes before and after fracturing flowback fluid treatment

| Sample | Oil content mg/L | Turbidity NTU | Color | Suspended matters mg/L | Total iron (mg/L) | COD | Mineralization mg/L |
|---|---|---|---|---|---|---|---|
| A1 | 0 | 1.8 | 5.4 | 8.7 | 4.7 | 1876 | 6751 |
| A2 | 0 | 2.7 | 8.1 | 5.5 | 6.5 | 1654 | 7649 |
| A3 | 0 | 3.1 | 6.3 | 9.4 | 5.1 | 2022 | 7237 |
| A4 | 0 | 4.5 | 12.5 | 11.2 | 8.3 | 2455 | 8640 |
| A5 | 0 | 1.4 | 4.9 | 6.3 | 1.2 | 1771 | 4107 |
| D1 | 0 | 8.7 | 17.6 | 12.4 | 14.6 | 3042 | 9104 |
| D2 | 0 | 6.5 | 21.7 | 15.7 | 9.5 | 3581 | 9371 |
| D3 | 0 | 5.6 | 9.7 | 9.5 | 5.4 | 1912 | 7428 |
| Blank | 45 | 38.4 | 271 | 277 | 58 | 5387 | 10425 |

It can be seen from Table 1 that the flocculant prepared by the examples of the present application can well treat the fracturing flowback fluid, which not only can reduce turbidity, color and suspended matters of the fracturing flowback fluid, but also can effectively reduce COD and total iron of the flowback fluid, and can reduce the mineralization of the flowback fluid to a certain extent.

It can be seen from Comparative Examples 1 and 2 that the flocculant finally prepared has a relatively poor effect in the absence of any one of allyl polyglycol ether and hydroxyethyl methacrylate phosphate, which shows that allyl polyglycol ether and hydroxyethyl methacrylate phosphate can play a synergistic role in the present application to increase the flocculation effect of the flocculant.

2. Degradability Test

To test the biodegradability of the flocculant prepared by the examples of the present application, the ratio of biochemical oxygen demand to chemical oxygen demand of 5 days was used for evaluation in this test example, the operation method was conventional in the art, and the final results are shown in Table 2, wherein the biodegradability is calculated as the ratio of $BOD_5$ to COD.

TABLE 2

Biodegradability test

| Sample | A1 | A2 | A3 | A4 | A5 | D3 |
|---|---|---|---|---|---|---|
| Biodegradability % | 72.4 | 71.8 | 72.9 | 73.1 | 72.1 | 40.5 |

It can be seen from Table 2 that the flocculants prepared by the examples of the present application all have better biodegradability, which is mainly due to the natural degradability of starch. In the examples of the present application, the addition amount of the other components except starch is less, and the final generated self-aggregation is less. Referring to Comparative Example 3, it can be seen that the large amount of acrylic acid added greatly reduces the biodegradability of the flocculant.

The above descriptions are only preferred embodiments of the present application, and are not intended to limit the present application in any form. Although the preferred embodiments above have disclosed the present application, they are not intended to limit the present application. Any of those familiar with the technical field, without departing from the scope of the technical solutions of the present application, can use the technical content disclosed above to make various changes and modify the technical content as equivalent changes of the equivalent embodiments. However, any simple modifications, equivalent changes and modifications made to the above embodiments according to the technical spirit of the present application without departing from the content of the technical solutions of the present application shall fall within the scope of the technical solutions of the present application.

What is claimed is:

1. A preparation method for a flocculant for treating fracturing flowback fluid, comprising the following steps in parts by weight: dissolving gelatinized starch in water, adding unsaturated polyethylene glycol, unsaturated short-chain carboxylic acid, hydroxyethyl methacrylate phosphate and an initiator under a nitrogen atmosphere for reaction for 3-8 h, and after the reaction is completed, separating and purifying to obtain a product; wherein a mass ratio of the gelatinized starch to the unsaturated polyethylene glycol to the unsaturated short-chain carboxylic acid to the hydroxyethyl methacrylate phosphate is 100:20-40:3-8:1-5.

2. The method according to claim 1, wherein the unsaturated polyethylene glycol is one of allyl polyethylene glycol ether and methallyl polyethylene glycol ether, and has a molecular weight of 400-1000.

3. The method according to claim 1, wherein the unsaturated short-chain carboxylic acid is one of acrylic acid, methacrylic acid and maleic acid.

4. The method according to claim 1, wherein the initiator is a mixture of a first initiator and persulfate, the first initiator is one of cerium sulfate, ammonium cerium sulfate and ammonium cerium nitrate, a mass ratio of the first initiator to the persulfate is 1:0.4-0.8, and an addition amount of the initiator is 0.5%-1.5% of a mass of the gelatinized starch.

5. The method according to claim 1, wherein the initiator is potassium permanganate, and an addition amount of the potassium permanganate is 0.8%-2% of a mass of the gelatinized starch.

6. The method according to claim 1, wherein the method comprises the following steps: dissolving gelatinized starch in water, introducing nitrogen to remove oxygen, adding an initiator, uniformly stirring, dropwise adding unsaturated polyethylene glycol or an aqueous solution thereof, unsaturated short-chain carboxylic acid or an aqueous solution thereof and hydroxyethyl methacrylate phosphate, reacting for 3-8 h at an initiation temperature after dropwise adding is completed, and separating and purifying to obtain a product.

7. The method according to claim 1, wherein the separation and purification comprises: distilling the product after the reaction under reduced pressure to remove a solvent to obtain a crude product, washing the crude product several times by using ethanol or acetone, and drying to obtain the flocculant.

8. A flocculant for treating fracturing flowback fluid prepared by using the method according to claim 1.

* * * * *